July 23, 1968

A. J. GEBHART 3,393,441

APPARATUS FOR MOVING BEARINGS TO AND FROM
PRESS-FIT RELATION ON SHAFTS

Filed Sept. 29, 1965

INVENTOR.
ADRIAN J. GEBHART
BY
Barnes, Kisselle, Raisch & Choate
ATTORNEYS

July 23, 1968

A. J. GEBHART 3,393,441

APPARATUS FOR MOVING BEARINGS TO AND FROM
PRESS-FIT RELATION ON SHAFTS

Filed Sept. 29, 1965

INVENTOR.
ADRIAN J. GEBHART
BY
Barnes, Kisselle, Raisch & Choate
ATTORNEYS

United States Patent Office 3,393,441
Patented July 23, 1968

3,393,441
APPARATUS FOR MOVING BEARINGS TO AND FROM PRESS-FIT RELATION ON SHAFTS
Adrian J. Gebhart, 10565 W. Outer Drive,
Detroit, Mich. 48223
Filed Sept. 29, 1965, Ser. No. 491,305
8 Claims. (Cl. 29—256)

ABSTRACT OF THE DISCLOSURE

Two thrust plates are provided, one for removing an inner bearing race from press-fit relation on a shaft and the other for forcing an inner bearing race into press-fit relation on the shaft. When the removal plate is actuated, segments disposed within a tapered opening in the plate are first moved radially into the race groove and then transmit axial force to push the race out of its press fit on the shaft. The second thrust plate has an opening for surrounding the shaft and an abutment which pushes an inner bearing race into press-fit relation on the shaft when the second thrust plate is actuated. Thrust-creating means act between the selected thrust plate and a flange on the shaft to actuate the selected thrust plate.

---

This invention relates generally to a device for moving bearings, particularly anti-friction bearings, axially to and from press-fit relation on shafts. Selected for illustration of the invention is an automobile axle having a flange at its end to which a wheel is bolted, an anti-friction bearing being press fitted into place generally adjacent the flanged end of the axle.

In the maintenance and repair of automotive vehicles, garage and service station operators have long had difficulty in removing anti-friction bearings from automobile axles and installing new bearings on the axles. The reason for this is that a great deal of force is required to move the bearing to and from press-fit relation on the axle. It has long been the practice at most garages to have this particular work done outside of their own facilities at shops equipped with relatively large, expensive hydraulic rams. Heretofore, numerous less expensive and smaller devices have been offered to the trade for use in garages and service stations but none of them have gained wide acceptance.

An objection common to both the hydraulic ram equipment and prior art devices for garage use is that they are fundamentally unsafe. This is because they are arranged to exert axial force on the outer bearing race, particularly in the process of bearing removal. The inner race strongly resists axial movement because of its press fit on the axle. This resistance is even greater where, as in many assemblies, a press-fitted retainer ring is used to help hold the inner race in proper position on the axle. As a result, the anti-friction elements, such as the balls in a ball bearing, are wedged radially outwardly by the groove in the inner race against the outer race. This outward radial force is so great that the outer race which is relatively hard and brittle frequently fractures and virtually explodes into shrapnel-like fragments. Operators of bearing-removal equipment have been seriously injured on many occasions by these exploding bearing races.

The object of this invention is to provide a bearing remover and installer which eliminates the hazards referred to above and which is relatively small, inexpensive, and conveniently operable so that it is available economically to even the smaller garages and service stations which perform maintenance and repair work.

Generally, the invention contemplates the use of a steel thrust plate having a central opening large enough to surround the inner bearing race after the outer race has been fractured by a hammer and removed, together with the anti-friction elements. A number of thrust screws on the plate project axially into engagement with axle flange. The central opening is tapered so that when the plate is moved axially in a bearing-removal direction by operation of the thrust screws, arcuate thrust plugs inserted within the opening are first wedged into the outer groove of the inner race and thereafter exert axial force on the inner race to advance it off of the axle.

A second steel thrust plate is provided having a central opening freely movable axially on the axle and dimensioned so that portions just outside of the opening are positioned to exert force on an inner bearing race through an interposed spacer ring. Where a retainer ring is used in conjunction with the inner race, the retainer ring can serve as the spacer ring. Ties are attachable to the thrust plates so that the thrust screws can be employed to pull a bearing into press-fit relation on an axle. One form of the invention is shown in the accompanying drawings.

Figure 1:
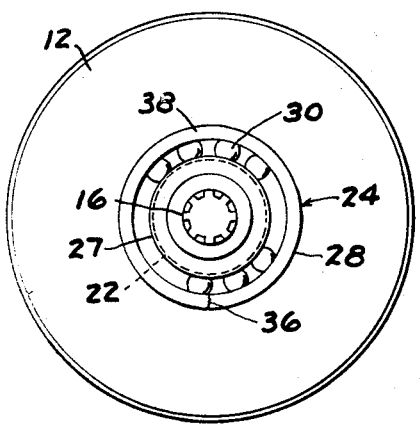
FIG. 1 is an end view of a flanged axle with a ball bearing and retainer ring thereon.
Figure 2:
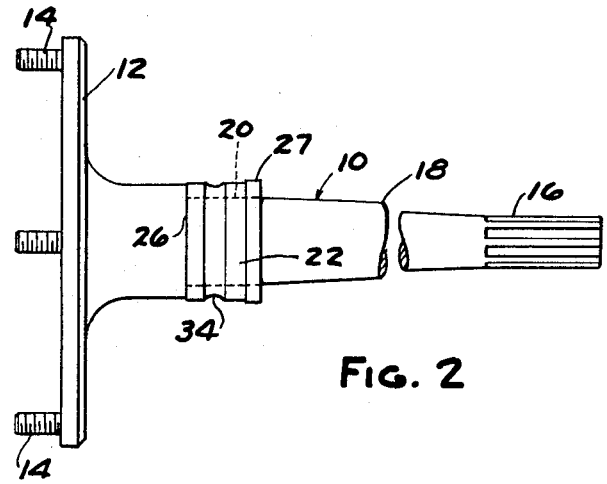
FIG. 2 is a side elevation of the axle and bearing with the outer race and balls removed.
Figure 3:
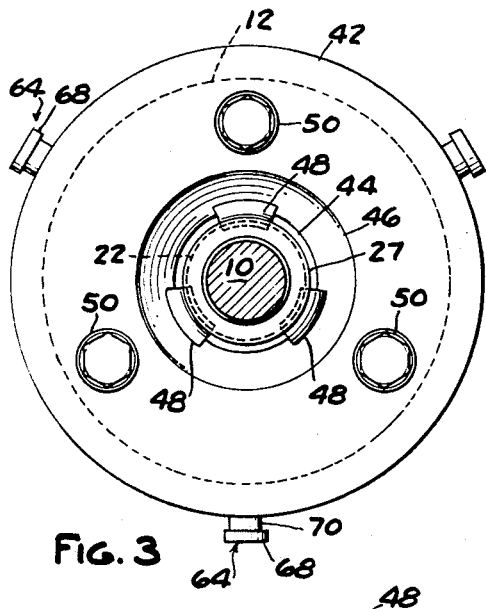
FIG. 3 is an end view of the axle with the outer race and balls removed and the bearing-removal apparatus of this invention in readiness for bearing removal.
Figure 5:
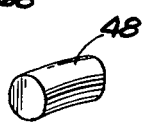
FIG. 5 is a somewhat enlarged perspective view of a thrust plug.

Shown in the drawings is an automotive vehicle axle 10 having at one end a flange 12 provided with bolts 14 for attachment to a vehicle wheel. The other end 16 of the axle is splined for connection to a conventional differential. Intermediate portions 18 of the axle taper outwardly to a cylindrical portion 20 upon which the inner race 22 of a ball bearing 24 is press fitted. The inner race is engaged against a positioning shoulder 26 on the axle; and a mild steel retainer ring 27, press fitted onto axle portion 20, abuts race 22 and helps hold it against the shoulder. Bearing 24 has an outer race 28, and bearing balls 30 are contained between an internal groove 32 (FIG. 6) in the outer race and an exterior groove 34 on the inner race.

Figure 4:
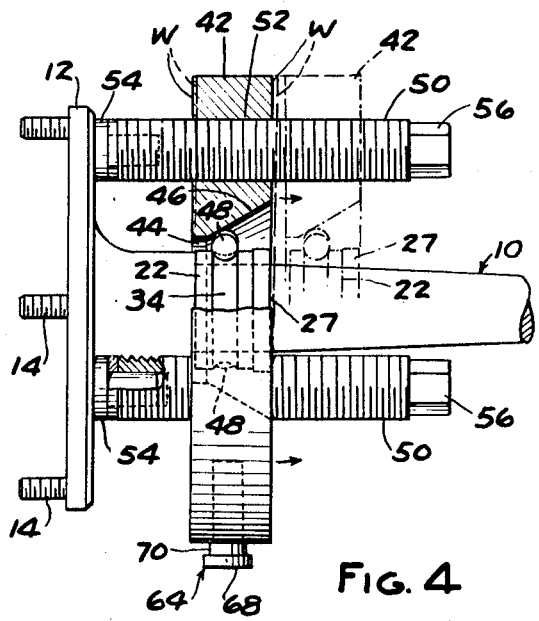
FIG. 4 is a side view, partly in elevation and partly in section, of the assembly shown in FIG. 3.

To remove bearing 24 and ring 27 from axle 10, outer race 28 is first fractured at two generally oppositely disposed locations 36, 38 by suitable means such as striking it sharply with a hammer. This step is accomplished easily, since the outer race is very hard and brittle. The outer race and balls 30 are then removed, thereby exposing inner race 22. For removing the inner race and retainer ring 27 from axle 10, a steel thrust plate 42 is provided. This thrust plate has a central opening 44 dimensioned to surround axle 10 and the exposed inner bearing race and retainer ring (FIG. 4). This opening has wall portions 46 which taper inwardly proceeding in a direction toward axle flange 12. A plurality of thrust plugs 48 are provided for insertion between tapered opening 46 and groove 34 in inner bearing race 22. These plugs have generally arcuate configuration and circular cross-section to conform generally to the shape of groove 34. Plugs 48 are preferably made of a material such as mild steel so that they will not fracture under the application of considerable force and so that they can distort slightly as required to fit within bearing grooves 34 of different diameters.

A number of thrust screws 50, preferably no less than three, are threaded through openings 52 in thrust plate 42. These screws are arranged in triangular configuration with respect to the axis of central opening 44 but the angular spacing between them need not be equal. The angular placement of the screws can be selected so that they remain clear of bolts 14 or bolt openings provided in some axle flanges 12. By way of example, in one commercially successful apparatus in accordance with this invention, two of the screws are spaced angularly about 96° from each other while the third is disposed about midway between the other two. This angular distribution was selected to accommodate axle flanges 12 having variously four, five, or six bolts 14 or bolt openings therein.

Screws 50 extend generally axially of thrust plate 42 so that when opening 44 is aligned with axle 10, the screws are positioned for thrust engagement against axle flange 12. Each thrust screw is shown as having a swiveled thrust button 54 at one end for engaging flange 12 and having a hexagon 56 at its other end for engagement by a wrench.

The apparatus includes a second thrust plate 58 for use in advancing a new bearing 24a and retainer ring 27 into press-fitted relation on axle portion 20. Bearing 24a may be constructed identically to old bearing 24 and the corresponding elements thereof bear similar reference characters.

Thrust plate 58 has a central opening 60 dimensioned to pass freely over axle 10. A ring R having an outer diameter greater than the diameter of opening 60 is provided for spacing thrust plate 58 axially from bearing 24a and for transmitting axial thrust of plate 58 to inner race 22 of bearing 24a. Ring R has an outer diameter smaller than the inner diameter of outer race 28 so that it will remain clear of the outer race. In axle-bearing assemblies using a retainer ring 27, the retainer ring can serve as thrust ring R.

Figure 8:
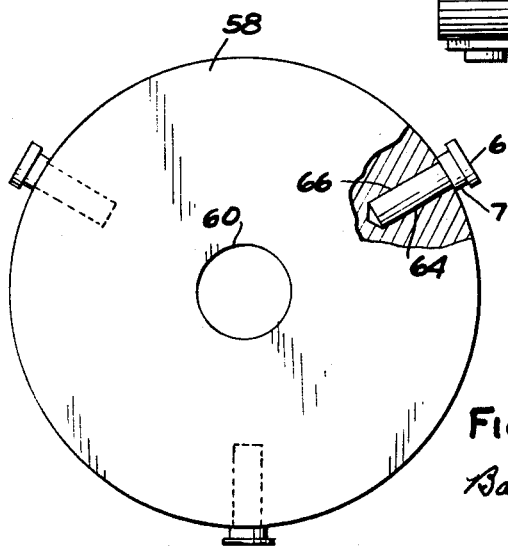
FIG. 8 is an end view of the bearing-installing thrust plate with portions shown in section and in phantom to illustrate structural details.
Figure 9:
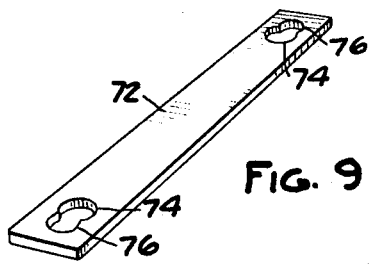
FIG. 9 is a perspective view of one of the ties between the two thrust plates.

Means are provided for transmitting thrust between plates 42 and 58 so that the force of thrust screws 50 can be utilized to actuate the thrust plate 58. For this purpose, each thrust plate is provided with a plurality of studs 64 press-fitted into radial openings 66, each stud having a head 68 spaced outwardly from the edge of its respective thrust plate to provide a notch 70, as represented in FIG. 8. The studs on each plate are distributed angularly around its central opening 44, 60; and on each plate, there are preferably at least three such studs.

The studs on the two plates are arranged so that they provide three axially aligned pairs when the plates are properly angularly oriented. A steel strap 72 is provided for each aligned pair of studs 64. At each end of the strap is an opening 74 which can be passed over a stud head 68, and each opening has a slotted extension 76 smaller than head 68 but dimensioned to engage within slot 70. With this arrangement, the strap openings can be hooked to studs 64 to provide ties for transmitting the force of thrust screws 50 through thrust plate 42 to thrust plate 58.

In use, it may be assumed that axle 10, together with its bearing 24 and retainer ring 27, have been removed from an automotive vehicle to facilitate removal and replacement of bearing 24. Exposed outer bearing race 28 is fractured and removed in the manner described above, thereby freeing bearing balls 30 for removal and exposing inner bearing race 22. Thrust plate 42 is passed over axle 10 and ends 54 of thrust screws 50 are engaged against the face of axle flange 12 disposed toward bearing 24.

Screws 50 are adjusted so that tapered wall portions 46 of central opening 44 are disposed radially outward of groove 34 in the inner bearing race. Thrust plugs 48 are then inserted between tapered opening 46 and groove 34. If, at this time, there is insufficient radial clearance for the plugs to nest within groove 34, screws 50 may be adjusted to shift thrust plate 42 to the left, as FIG. 4 is viewed, to increase the radial spacing. When this has been done, screws 50 are then operated to move thrust plate 42 to the right, as FIG. 4 is viewed.

Initially, tapered wall portion 46 closes toward race 22 and wedges plugs 48 into engagement within groove 34. Thereafter, upon continued movement of plate 42 to the right under the action of the thrust screws, tapered wall 46 exerts axial thrust on plugs 48 which, in turn, transmit this thrust to wall portions of groove 34. Continued movement of the plate thereby causes the thrust elements to force bearing race 22 and retainer ring 27 axially off of cylindrical portion 20 of the axle to the tapered portion as shown in broken lines in FIG. 4. The bearing race and retainer ring can then be freely slipped off of the end of the axle.

Because of the varying diameter of opening 44 provided by tapered portion 46, the device can be used for removing bearing races 22 having a substantial range of diameters. Screws 50 can be turned by any suitable tool; for example, either by a hand wrench or a powered wrench. In most garages and service stations, this will probably be done by a single wrench applied successively to the individual screws. This results in a wobbling action of plate 42 represented in somewhat exaggerated form at W in FIG. 4. The wobbling action is believed to be transmitted to bearing race 22 and retainer ring 27 so that, in effect, they are walked off of the axle. Where more elaborate equipment is available, all screws 50 may be turned at once for advancing the bearing race and retainer ring off of axle portion 20.

Figure 6:
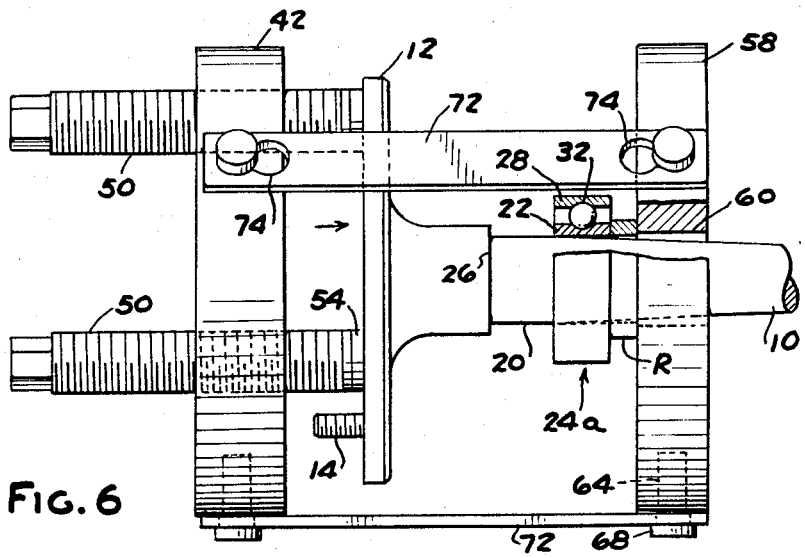
FIG. 6 is a side view, partly in elevation and partly in section, showing apparatus according to this invention assembled on an axle in readiness for installing a new bearing thereon.

To install new bearing 24a on the axle, it and spacer ring R (retainer ring 27, if used) are manually advanced as far as possible onto the axle toward shoulder 26. Thrust plate 58 is abutted against ring R. Thrust plate 42 is aligned with axle flange 12, and screws 50 are engaged against the face of the flange disposed away from the bearing. Tie strips 72 are connected between the thrust plates by engaging the openings therein over stud heads 68 in the manner described. Screws 50 are then operated to force thrust plate 42 to the left, as FIG. 6 is viewed, away from axle flange 12. This movement is transmitted to thrust plate 58 which, through ring R, forces inner bearing race 22 into press-fitted relation on axle portion 20 and against axle shoulder 26. If ring R comprises a retainer ring 27, the retainer ring follows races 22 into press-fit relation on axle portion 20.

Figure 7:
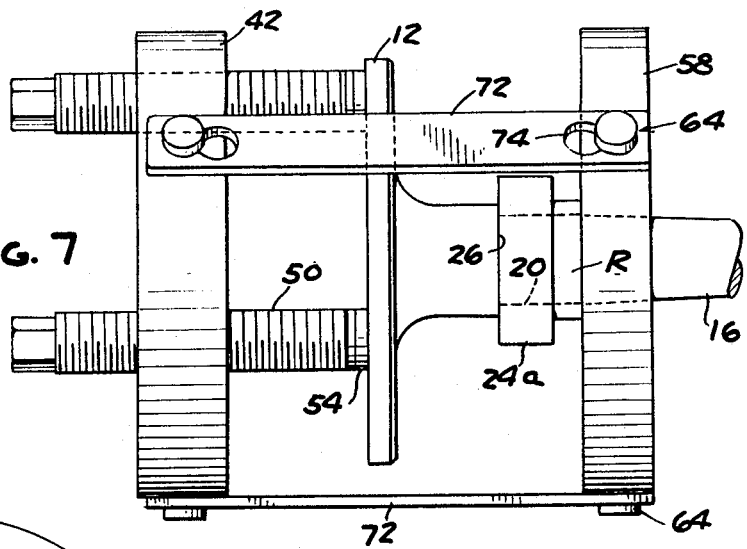
FIG. 7 is a side, generally elevational view illustrating the assembly of FIG. 6 upon completion of the bearing installation.

When bearing 24a and retainer ring 27, if used, have been advanced to their proper position on the axle, as shown in FIG. 7, thrust screws 50 are reversed to shift thrust plate 42 to the right, as FIG. 7 is viewed, until holes 74 therein are aligned with stud heads 68. Ties 72 can then be removed and the apparaatus disassembled from the axle. The axle, with its new bearing, can then be reinstalled on its vehicle.

I claim:

1. For removing an exteriorly grooved ball bearing race from an axle having a flange, apparatus comprising,
   a thrust member having an opening therein defined by wall portions which are adapted to be positioned radially outwardly of an inner ball bearing race on on axle with which said apparatus is adapted to be used,
   said wall portions tapering inwardly in a direction opposite to the bearing-race-removing direction, thrust-transmitting means interposable between said wall portions and race, said wall portions, responsive to moving of said member axially of said axle in the bearing-race-removing direction, being operable to move said thrust means radially inwardly into the race groove to provide an axial thrust-transmitting connection between said member and race, said thrust-transmitting means, responsive to engagement within said groove, being operable to transmit axial thrust from said member to said race in said bearing-race-removing direction, and thrust-creating means operable to exert force on the flange of an axle with which said apparatus is adapted to be used in a direction opposite to said bearing-race-removing direction, said thrust-creating means being operatively connected with said thrust member so that said member and thrust-transmitting means are movable in said bearing-race-removing direction for removing the race from the axle under the influence of the reaction to said force.

2. The apparatus defined in claim 1 wherein said thrust-transmitting means comprises a plurality of thrust elements having outer surface portions engageable by said wall portions and inner surface portions engageable within the bearing race groove.

3. The apparatus defined in claim 2 wherein said elements are generally arcuate in shape so that they conform generally to the curvature of the portions of the groove in a bearing race with which said apparatus is adapted to be used.

4. The apparatus defined in claim 3 wherein said elements have generally circular sectional shape.

5. For removing an exteriorly grooved inner bearing race from an axle having a flange, apparatus comprising, a thrust member having wedge means adapted to be positioned radially outwardly of an inner ball bearing race on an axle with which said apparatus is adapted to be used, thrust-transmitting means interposable between said wedge means and race, said wedge means, responsive to movement of said member axially of said axle in a bearing-race-removing direction, being operable in one range of said movement to move said thrust-transmitting means radially into the race groove, and being operable in a continued range of said movement to exert force on said thrust-transmitting means in said direction, said thrust-transmitting means, in said continued range of movement, being operable to transmit axial thrust from said member to said race in said direction, and thrust-creating means operable to exert force on the flange of an axle with which said apparatus is adapted to be used in a direction opposite to the first-mentioned direction, said thrust-creating means being operatively connected with said thrust member so that said member and thrust-transmitting means are movable in the first-mentioned direction for removing the race from the axle under the influence of the reaction to said force exerted by said thrust-creating means.

6. The apparatus defined in claim 5 wherein said wedge means comprises a tapered opening in said thrust member.

7. For removing an exteriorly grooved inner ball bearing race from an axle having a flange, apparatus comprising, a thrust plate having an opening therethrough dimensioned to surround an inner bearing race on an axle with which said apparatus is adapted to be used, said opening having axially tapered portions, a plurality of thrust-transmitting elements interposable between said opening and bearing race, said elements having generally arcuate shape so that they conform generally to the curvature of the groove in the bearing race, said elements having generally circular sectional shape, portions of the tapered wall of said opening having a diameter less than the diameter of the race groove plus the diameter of said elements, a plurality of screws threaded through openings in said thrust plate disposed radially outwardly of the first-mentioned opening at different angular locations around the axis of the first-mentioned opening, said screws having end portions extending away from said plate and being adapted for thrust engagement with the flange on an axle with which said apparatus is adapted to be used, said screws, responsive to turning thereof, being operable to exert thrust on the flange and reaction thrust on said thrust plate for moving said thrust plate in a bearing-race-removing direction, the taper of the first-mentioned opening of said thrust plate being inward in a direction opposite to the first-mentioned direction, said tapered wall portions being operable responsive to movement of said thrust plate in the first-mentioned direction to engage said thrust elements and move them radially into the bearing race groove and thereafter to exert axial thrust on said elements, said elements being operative to transmit said axial thrust to said bearing race for removing the same from the axle responsive to continued movement of said thrust plate in said direction under the influence of said screws.

8. An assembly for moving an inner bearing race to and from press-fit relation on an axle comprising, two thrust plates, one of which has a tapered central opening and a plurality of threaded openings angularly distributed around said central opening, said central opening being dimensioned to surround an inner bearing race on an axle with which said assembly is adapted to be used, thrust screws in said threaded openings having end portions positioned and adapted for thrust engagement against a flange on the axle when said central opening is axially aligned with the axle, a plurality of thrust-transmitting elements contoured to fit within the exterior groove of an inner bearing race and to project from said groove for engagement by tapered portions of said central opening so that upon axial movement of said one thrust plate in a bearing-removal direction responsive to thrust operation of said screws against the axle flange, said thrust-transmitting elements are constricted into axial thrust-transmitting relation within the bearing groove for removing the same from the axle, the other of said thrust plates having a central opening through which the axle is freely movable, the latter said opening having a diameter smaller than the outer diameter of an inner bearing race so that when an axle is inserted first through a bearing and then through said opening in said other thrust plate, said other thrust plate is movable to exert force on the bearing in a direction for advancing it further onto the axle, a plurality of ties, each having a length such that it spans the axial distance between said thrust plates when said other thrust plate is positioned for so advancing a bearing and said one thrust plate is disposed on the opposite side of said bearing and axle flange from said other thrust plate with said thrust screws extending toward said other thrust plate into thrust engagement against the axle flange, and fastening means by which said ties are fastenable to said thrust plates, said ties, responsive to movement of said one thrust plate away from the axle flange upon operation of said screws, being effective to transmit such movement to said other thrust plate for advancing the bearing onto the axle.

References Cited

UNITED STATES PATENTS

| | | | |
|---|---|---|---|
| 1,747,689 | 2/1930 | Wubbenhorst | 29—260 |
| 1,930,859 | 10/1933 | Munro | 29—256 X |
| 2,230,918 | 2/1941 | Walter | 29—256 |
| 2,359,099 | 9/1944 | Fechner | 29—256 X |
| 3,060,558 | 10/1962 | Levenson | 29—256 |
| 3,146,522 | 9/1964 | Wright | 29—256 |
| 3,174,218 | 3/1965 | McConaha | 29—256 |

MILTON S. MEHR, *Primary Examiner.*